March 8, 1938. A. NADIN 2,110,234
PHOTOGRAPHIC COPY HOLDING AND ENLARGING FRAME
Filed Feb. 3, 1937
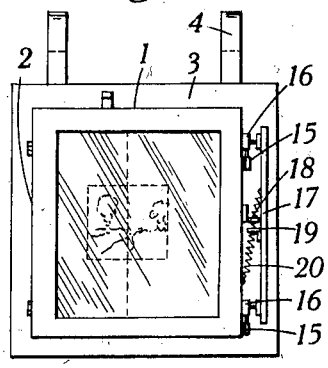
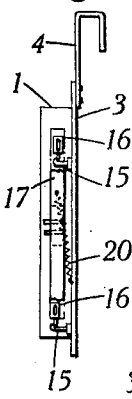
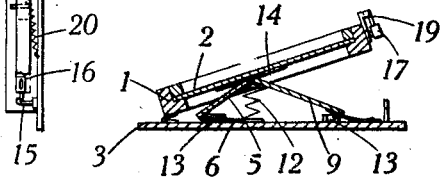
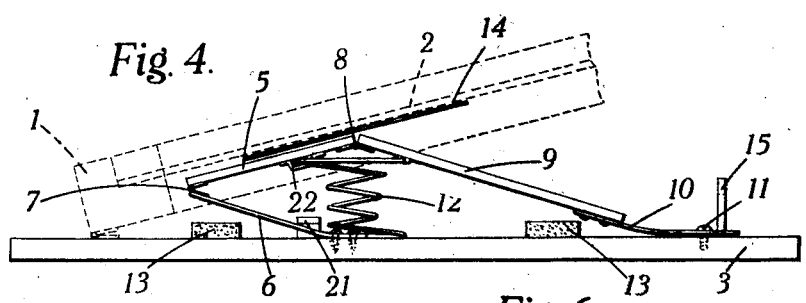
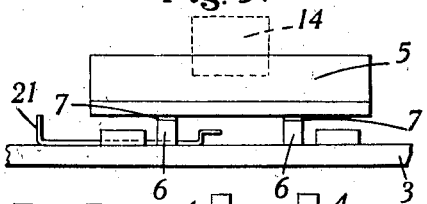
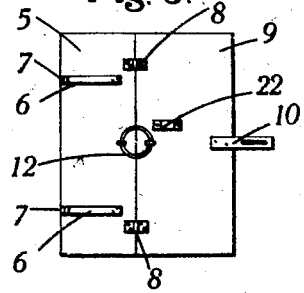
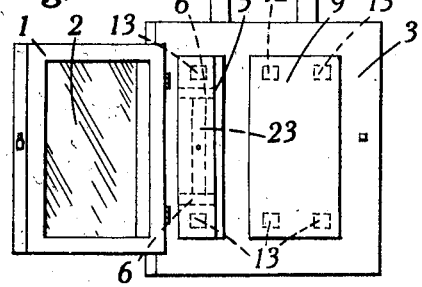
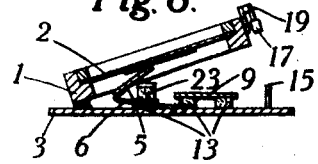
INVENTOR.
Albert Nadin.
BY
Stone, Boyden & Mack.
ATTORNEYS.

Patented Mar. 8, 1938

2,110,234

UNITED STATES PATENT OFFICE 2,110,234

PHOTOGRAPHIC COPY HOLDING AND ENLARGING FRAME

Albert Nadin, London, England

Application February 3, 1937, Serial No. 123,934
In Great Britain February 11, 1936

14 Claims. (Cl. 88—24)

The present invention relates to photographic copy holding and enlarging frames of the kind which are used in the vertical position, it being understood that the term "copy" is used in the sense usual in the printing trade as meaning an original (which may be a drawing, photograph or printed matter) to be copied. Copy holding frames are commonly employed in this position in connection with process engraving both for line and half line work, being generally hung or otherwise mounted upon the easel of the copying camera apparatus which is usually in the vertical position. Frames are similarly used in photographic enlarging for holding the sensitized paper on which an enlargement or reduction is to be photographically printed.

Hitherto it has been necessary in using such copy holding frames, when it is desired to insert a new copy into the frame, to take the frame down from the easel and lay it on a table in a horizontal position, in order that the copy may not shift from its proper position in the frame while the frame is being closed. With the frame in a vertical position the copy will naturally drop down to the bottom of the frame before the frame can be closed down on it. The same disadvantage applies to photographic enlarging, when the sensitized paper happens to be of a size less than the full size of the frame, as is frequently the case.

The object of this invention is to overcome the above mentioned disadvantage and enable the copy or sensitized paper to be inserted into the frame while the latter is in the vertical position, i. e. without taking it down from the easel so that when the frame is closed the copy or sensitized paper is held in the correct position in the frame.

The improved frame according to the invention comprises a back board, a frame containing a cover glass hinged thereto, and a divided back for the frame mounted on the back board, part of said back being hingedly connected to the back board along its outer edge and being pressed away from the back board by spring means, so that in closing the frame against the back board the cover glass first makes contact with the inner edge of the hinged portion of the frame back, before the frame is fully closed against the back board.

Preferably, the connection between the hinged portion of the back and the back board, which may be resilient, includes parallel motion links. Thus, the hinged portion of the back may be connected to the back board by hinges the free flaps of which are mounted on leaf springs extending inwardly from the edge of the back and secured at their opposite ends to the back board towards the middle thereof.

In one construction, the divided parts of the frame back are hinged together and the edge of the back opposite from the hinged edge is loosely connected to the back board so that only restricted movement of said edge is allowed, sufficient to permit the required movement of the two halves of the back.

According to a modified construction, the part of the divided back which is not spring hinged to the back board is fixedly mounted on the back board in parallel relationship thereto and is entirely disconnected along the inner edge from the spring hinged portion of the back.

Preferably rubber pads or blocks are mounted upon the back board, upon which the frame back is resiliently supported when the frame is closed, and a device is provided for locking the frame back to the back board, with the whole of the former lying substantially parallel to the back board, so that when desired the frame can be used exactly as an ordinary fixed back frame.

In order that the invention may be more clearly understood and readily carried into practice I have appended hereto a sheet of drawing illustrating the invention, wherein:—

Fig. 1 is a front view of a copying or enlarging frame according to the invention, when closed;

Fig. 2 is an edge view of the frame, also when closed;

Fig. 3 is a cross sectional view of the frame, partly closed into copy or paper holding position;

Figs. 4, 5 and 6 are views to an enlarged scale showing the collapsing back in end view, side view, and back view respectively;

Fig. 7 is a front view of a modified construction with the frame fully open, and Fig. 8 is a cross sectional view with the frame partly closed into copy or paper holding position.

The copying or enlarging frame 1 carrying the cover glass 2 is hinged in the usual manner along one edge to a back board 3, which is adapted to be hung or mounted upon the easel of an enlarging or copying camera apparatus, in any convenient manner, as by means of a pair of hooks 4.

Copying or enlarging frames usually have a fixed back mounted on the back board 3, although in some cases instead of being rigidly fixed to the back board, it is resiliently mounted thereon. According to the present invention, however, the back 5, 9 is divided into two parts, one of which 5, is connected along its outer edge to the back board 3, by spring hinges, formed, in the construction illustrated by the drawing, by inwardly extending leaf springs 6 connected at one end to the free flaps of hinges 7 on the back portion 5, and fastened down to the back board 3 at their other ends, towards the centre of the back board.

Referring now more particularly to Figs. 1 to 6 of the drawing, the inner edge of the back part 5 is hinged to the other portion 9 of the back at 8 and the outer edge of the back portion 9 is connected to the back board 3 by a slotted leaf spring 10 and a screw 11, so as to be capable of limited lateral and angular movement in relation to the back board.

Bearing on the underside of the back portions 5 and 9 is a coil spring 12, which is disposed centrally if only one such spring is provided. However, two or more springs distributed along the hinge line of the two back portions 5 and 9 may be provided if desired. Preferably, also, on the back board 3 are disposed four or more sponge rubber blocks 13 or other cushioning members, upon which the back 5, 9 is resiliently supported when the frame is closed.

As will be readily appreciated from the drawing, when the frame 1 is opened the coil spring 12 expands and the back 5, 9 assumes the position shown in Figs. 3, 4 and 5, with a medial ridge directed towards the glass 2 of frame 1. If now a copy or sheet of sensitized paper 14 is held with the hand upon the glass 2 in the desired position so that it crosses the line of the said ridge, as the frame 1 is closed down it will first make contact with the inner edge of the back portion 5 and the copy or paper 14 will be gripped so that it will remain in position after removal of the hand, which up to this moment has held it in position against the glass 2. The frame 1 may then be closed completely down against the back board 3 without the copy or sheet 14 shifting, owing to the yielding mounting of the back 5, 9 provided by the spring 12 and spring hinges 6, 7, the latter of which permit a more or less parallel movement of the back portion 5, which substantially eliminates any sliding movement of the copy or paper 14 on the glass 2 as the frame 1 is closed down.

When closed down the frame 1 may be fastened by any suitable fastening means along the edge opposite to its hinges, cooperating with fastening means on the back board 3. For example, as shown in the drawing, the fastening means comprises a pair of hooks 15 on the back board, and a pair of spring bolts mounted in casings 16 on the edge of the frame, and operated together by a bar 17, which may be moved longitudinally against a tension spring 18 by a thumb piece 19, when pressed towards a fixed finger piece 20 on the frame 1.

In case it may be desired at any time to use the frame as an ordinary frame with a fixed back, a sliding bolt 21 may be mounted on the back board 3, the hooked end of which may be engaged by longitudinal movement of the bolt 21 under a bridge piece 22 on the back portion 5, when the back 5, 9 is flattened out parallel to the back board 3 by pressure applied centrally thereto.

In the modified construction illustrated by Figs. 7 and 8 the two back portions 5, 9 are entirely disconnected from one another and the portion 9 is mounted in the normal position parallel to the back board 3, on the rubber blocks 13. The portion 5 is spring hinged along its outer edge as before, but instead of the coil spring 12, a double leaf spring 23 is mounted on the back board 3 to bear with its ends upon the back portion 5. The action of this construction is substantially the same as with the construction illustrated by Figs. 1 to 3, but it has the advantage that more space is available for accommodating the hand when the copy or paper 14 is being held in position as the frame 1 is being closed down.

The improved construction of copying or enlarging frame is particularly advantageous when dealing with small or irregularly shaped originals to be copied, since it is possible to hold several of these in the desired positions with the hand while the frame is being closed down.

What I claim is:—

1. A photographic copy holding and enlarging frame, comprising a back board, a frame hinged along one edge thereto, a cover glass in said frame, a divided back for the frame mounted on said back board, an edge part of said divided back being hingedly connected along its outer edge to parallel motion links mounted on the back board, and spring means acting between said hinged part and said back board to press the former towards said cover glass, whereby said cover glass makes contact with the inner edge of said hinged back part before said frame is fully closed down on said back board.

2. A photographic copy holding and enlarging frame, comprising a back board, a frame hinged along one edge thereto, a cover glass in said frame, a divided back for the frame mounted on said back board, parallel motion links hinging a part of said divided back along one edge to the back board, and spring means acting between said hinged part and said back board to press the former towards said cover glass, whereby said cover glass makes contact with the inner edge of said hinged back part before said frame is fully closed down on said back board.

3. A photographic copy holding and enlarging frame, comprising a back board, a frame hinged along one edge thereto, a cover glass in said frame, a divided back for the frame mounted on said back board, resilient hinges connecting a part of said divided back along one edge to the back board, and spring means acting between said hinged part and said back board to press the former towards said cover glass, whereby said cover glass makes contact with the inner edge of said hinged back part before said frame is fully closed down on said back board.

4. A photographic copy holding and enlarging frame, comprising a back board, a frame hinged along one edge thereto, a cover glass in said frame, a divided back for the frame mounted on said back board, having its parts hinged together along their edges, one edge portion of said back being hinged along one edge to the back board, and the opposite edge portion being loosely connected at its free edge to said back board so that only restricted movement of said edge is allowed, and spring means acting between said hinged part and said back board to press the former towards said cover glass, whereby said cover glass makes contact with the inner edge of said hinged back part before said frame is fully closed down on said back board.

5. A photographic copy holding and enlarging frame, comprising a back board, a frame hinged along one edge thereto, a cover glass in said frame, a divided back for the frame mounted on said back board, parallel link members hingedly connected at one end to the outer edge of an edge portion of said divided back, extending inwardly beneath said back and fastened to the back board at their other ends, and spring means acting between said hinged part and said back board to press the former towards said cover glass, whereby said cover glass makes contact with the inner edge of said hinged back part before said frame is fully closed down on said back board.

6. A photographic copy holding and enlarging frame, comprising a back board, a frame hinged along one edge thereto, a cover glass in said frame, a divided back for the frame mounted on said back board, parallel leaf springs hingedly connected at one end to the outer edge of an edge portion of said divided back, extending inwardly beneath said back and fastened to the back board at their other ends, and spring means acting between said hinged part and said back board to press the former towards said cover glass, whereby said cover glass makes contact with the inner edge of said hinged back part before said frame is fully closed down on said back board.

7. A photographic copy holding and enlarging frame, comprising a back board, a frame hinged along one edge thereto, a cover glass in said frame, a divided back for the frame mounted on said back board, having its parts hinged together along their edges, parallel link members hingedly connected at one end to the outer edge of an edge portion of said divided back, extending inwardly beneath said back and fastened to the back board at their other ends, means loosely connecting the opposite edge portion of the back at its free edge to said back board so that only restricted movement of said edge is allowed, and spring means acting between said hinged part and said back board to press the former towards said cover glass, whereby said cover glass makes contact with the inner edge of said hinged back part before said frame is fully closed down on said back board.

8. A photographic copy holding and enlarging frame, comprising a back board, a frame hinged along one edge thereto, a cover glass in said frame, a divided back for the frame mounted on said back board, having its parts hinged together along their edges, parallel leaf springs hingedly connected at one end to the outer edge of an edge portion of said divided back, extending inwardly beneath said back and fastened to the back board at their other ends, means loosely connecting the opposite edge portion of the back at its free edge to said back board so that only restricted movement of said edge is allowed, and spring means acting between said hinged part and said back board to pass the former towards said cover glass, whereby said cover glass makes contact with the inner edge of said hinged back part before said frame is fully closed down on said back board.

9. A photographic copy holding and enlarging frame, comprising a back board, a frame hinged along one edge thereto, a cover glass in said frame, a two part divided back for the frame mounted on said back board, parallel leaf springs hingedly connected to the outer edge of one of the parts of said divided back, extending inwardly beneath said back, and fastened to the back board at their other ends, and spring means acting between said hinged part and said back board to press the former towards said cover glass, whereby said cover glass makes contact with the inner edge of said hinged back part before said frame is fully closed down on said back board.

10. A photographic copy holding and enlarging frame, comprising a back board, a frame hinged along one edge thereto, a cover glass in said frame, a two part divided back for the frame mounted on said back board having its parts hinged together along their edges, parallel leaf springs hingedly connected to the outer edge of one of the parts of said divided back, extending inwardly beneath said back, and fastened to the back board at their other ends, means loosely connecting the opposite edge of said back to said back board so that only restricted movement of said edge is allowed, and spring means acting between said hinged part and said back board to press the former towards said cover glass, whereby said cover glass makes contact with the inner edge of said hinged back part before said frame is fully closed down on said back board.

11. A photographic copy holding and enlarging frame, comprising a back board, a frame hinged along one edge thereto, a cover glass in said frame, a two part divided back for the frame mounted on said back board, parallel leaf springs hingedly connected to the outer edge of one of the parts of said divided back, extending inwardly beneath said back, and fastened to the back board at their other ends, the other part of the back being mounted on said back board in parallel relationship thereto without connection to the hinged back portion, and spring means acting between said hinged part and said back board to press the former towards said cover glass, whereby said cover glass makes contact with the inner edge of said hinged back part before said frame is fully closed down on said back board.

12. A device as set forth in claim 9, including an adjustable locking bar mounted on said back board behind said divided back, and a cooperating locking part on the back of the hinged back portion engageable by said locking bar, to hold the hinged back portion in parallel relationship to said back board.

13. A device as set forth in claim 9, including resilient blocks mounted on the back board behind the divided back, for supporting said back when in parallel relationship to said back board.

14. A photographic copy holding and enlarging frame, comprising a back board, a frame hinged along one edge thereto, a cover glass in said frame, a two part divided back for the frame mounted on said back board, one part of said divided back being hingedly connected along its outer edge to parallel motion links mounted on said back board, the other part of the back being mounted on said back board in parallel relationship thereto without connection to the hinged back portion, and spring means acting between said hinged part and said back board to press the former towards said cover glass, whereby said cover glass makes contact with the inner edge of said hinged back part before said frame is fully closed down on said back board.

ALBERT NADIN.